(No Model.)

J. R. VAN WINKLE.
DRAG SAW SUPPORT AND GUIDE.

No. 359,042. Patented Mar. 8, 1887.

WITNESSES:

INVENTOR:
J. R. Van Winkle
BY Munn & Co.
ATTORNEYS.

UNITED STATES PATENT OFFICE.

JOHN ROLLA VAN WINKLE, OF ABERDEEN, WASHINGTON TERRITORY.

DRAG-SAW SUPPORT AND GUIDE.

SPECIFICATION forming part of Letters Patent No. 359,042, dated March 8, 1887.

Application filed September 29, 1886. Serial No. 214,867. (No model.)

*To all whom it may concern:*

Be it known that I, JOHN ROLLA VAN WINKLE, of Aberdeen, in the county of Chehalis and Territory of Washington, have invented a new and Improved Drag-Saw Support and Guide, of which the following is a full, clear, and exact description.

My invention relates to a support and guide to a drag-saw when used for undercutting logs, and has for its object to provide a simple, inexpensive, readily-adjustable, and efficient device of this character.

The invention consists in certain novel features of construction and combinations of parts of the saw support and guide, all as hereinafter described and claimed.

Reference is to be had to the accompanying drawings, forming a part of this specification, in which similar letters of reference indicate corresponding parts in all the figures.

Figure 1:
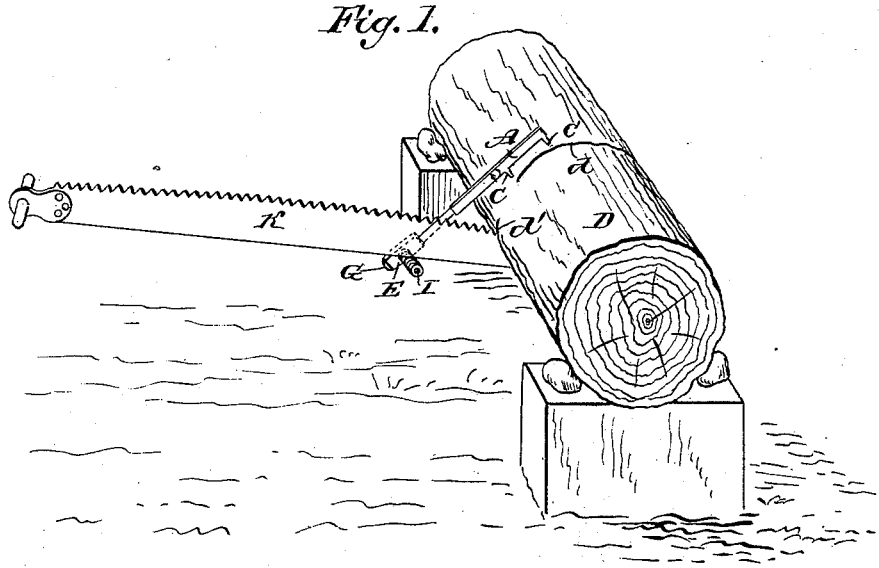
Figure 2:
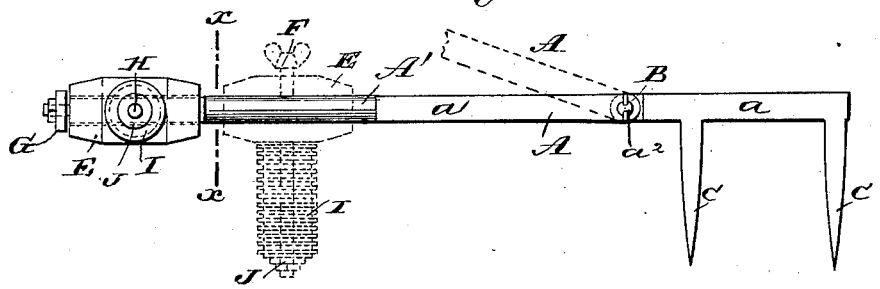
Figure 3:
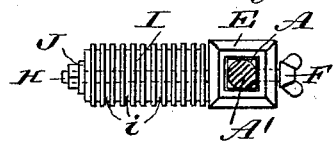

Figure 1 is a perspective view illustrating the use of my improved drag-saw support and guide. Fig. 2 is a side view of the saw support and guide drawn to a larger scale and indicating parts in other positions in dotted lines; and Fig. 3 is a cross-sectional elevation of the support and guide, taken on the line *x x*, Fig. 2.

I make the main bar A of the saw support and guide in two parts, *a a'*, jointed together at $a^2$, and provided with a set-screw, B, or other clamp device at the joint, allowing it to be tightened to hold the two parts *a a'* of the bar A at any desired relative adjustment, as hereinafter more fully explained.

The outer part, *a*, of the main bar A is provided with a couple of dogs, C C, which may be driven into a log, D, to hold the bar A securely to the log.

The main bar is for the most part made square or rectangular or flat-sided in cross-sectional form, and a head, E, has an aperture fitting the bar, thereby allowing the head E to be slid along the bar A, and held thereto by a set-screw, F, or other suitable clamping device carried by the head, and at its back end the bar A is provided with a stop-collar or nut, G, which prevents the head E slipping from the bar. At one side, preferably the side opposite the one in which the set-screw F is fitted, the head E is provided with a fixed pin, H, which serves as an axle to a roller, I, which is journaled on the pin H, and at its periphery is provided with a series of grooves, *i*, which are formed in the periphery of the roller directly across or at a right angle with the axle or axis of the roller. These grooves *i* are of proper width to receive the back of the blade of a drag-saw. A collar, J, on the end of the pin or axle H, holds the roller I on the axle and allows it to revolve freely thereon.

A portion, A', of the main bar A, for about the length of the roller-supporting head E, is made smaller than the rest of the bar, and preferably round, thus allowing the head to be turned on this part of the bar to cause the roller to project either to the right or left hand side of the bar when the head is again slid onto the flat-sided part of the bar. Dotted lines in Fig. 2 illustrate how the head, with its roller, may be swung on the thinner portion A' of the main bar to adjust the head and roller to the right or left of the bar, accordingly as it may be more convenient or desirable to fasten or dog the saw support and guide to the log at either the left or right of the cut or kerf to be made in the log by the saw. In the drawings Fig. 1 shows the roller I at the right-hand and the main bar dogged to the log at the left of the saw-cut. When the bar A is dogged at the right of the saw-cut, the roller I will be projected from the left side of the main bar, as will readily be understood.

In using the saw support and guide the dogs C C of the main bar A will be driven into the log D, at the side of an upper cut, *d*, made in the log as far as possible, or until the saw-blade K had bound in this upper cut. The saw-blade will then be taken from the upper cut, *d*, and will be rested by its back in one of the grooves *i* of the roller I, and the saw may now be worked backward and forward to make the under cut, *d'*, across the log toward the top cut, *d*. The series of grooves *i* in the roller I allows the saw-blade to be quickly adjusted laterally in any one of them, causing the blade to cut at *d'*; hence the series of grooves *i* obviates the necessity of careful measurements or work in dogging the support and guide to the log, thus saving time in the work. As the undercutting at *d'* progresses, the roller I may be moved along the bar A and fastened by the screw F closer to the log, to accommodate the feed of the saw through the log; but the upward feed of the saw-blade may be accommodated more easily and quickly by loosening the fastening B at the joint $a^2$ of the main bar and swinging the back part $a'$ of the bar upward to raise the roller I, and thereby lift the saw. This adjustment of the bar is indicated in part by the dotted lines in Fig. 2 of the drawings.

It is obvious that a saw support and guide having dogs by which it may be fastened to the log independently of a support from the ground is far more convenient to use than one supported on or from the ground, and there is less danger of breaking the saw when the upper cut is met by the under cut and the divided log falls than if the saw were supported from the ground.

The main bar A may be made without a joint at B, or in one piece having the dogs at one end and the saw-blade-supporting devices at the other end.

Having thus fully described my invention, what I claim as new, and desire to secure by Letters Patent, is—

1. A saw support and guide, comprising a bar having attaching-dogs and a laterally-projecting grooved support at the side of the bar, and forming a seat for the back of a saw-blade, substantially as herein set forth.

2. A saw support and guide, comprising a bar and a grooved saw support and guide held thereto and made adjustable to either side of the bar, substantially as herein set forth.

3. A saw support and guide, comprising a bar and a laterally-projecting saw support and guide held thereto, and provided with a series of grooves allowing lateral adjustment of the saw-blade independently of the supports holding the bar to or next the log to be undercut, substantially as herein set forth.

4. A saw support and guide, comprising a bar having attaching-dogs, and a rotary peripherally-grooved saw-blade support and guide held to the side of the bar, substantially as herein set forth.

5. A saw support and guide, comprising a bar having attaching-dogs, and a peripherally-grooved roller support and guide for the saw, made adjustable to project from either side of the bar, substantially as herein set forth.

6. A roller support and guide, comprising a main bar made in two jointed sections, a clamping device at the joint, and one section having dogs adapting it for attachment to a log and the other section carrying a support and guide for the back of a saw-blade, substantially as herein set forth.

7. The combination, in a saw support and guide, of a bar, A, dogs C C on the bar, a head-block, E, fitted adjustably on the bar and carrying a laterally-projecting grooved support for a saw-blade, and said bar A, having a thin portion, A', allowing the head-block to be turned on it to adjust the saw-support to either side of the bar A, substantially as herein set forth.

8. The combination, in a saw support and guide, of a bar, A, a head-block, E, thereon, and a roller, I, journaled on the head-block and provided with a series of peripheral grooves, $i$, allowing lateral adjustment of the saw-blade independently of the supports holding the bar A to or next a log to be undercut, substantially as herein set forth.

9. The combination, in a saw support and guide, of a bar, A, made in two parts, $a$ $a'$, joined at $a^2$, a clamping device at said joint, a head-block, E, fitted on the bar, and a roller, I, journaled on the block E, and provided with a series of peripheral grooves, $i$, substantially as herein set forth.

10. The combination, in a saw support and guide, of a flat-sided bar, A, made in two parts, $a$ $a'$, joined at $a^2$, a clamping device at said joint, and said bar having a reduced part, A', a head-block, E, fitted on the bar, a peripherally-grooved roller, as at I, journaled on the block E, and a clamping device, as at F, adapted to fasten the block E to bar A, substantially as described, for the purposes set forth.

JOHN ROLLA VAN WINKLE.

Witnesses:
J. M. WALKER,
JOHN R. WALKER.